US008621445B2

(12) United States Patent
Bangfei et al.

(10) Patent No.: US 8,621,445 B2
(45) Date of Patent: Dec. 31, 2013

(54) WRAPPER FOR PORTING A MEDIA FRAMEWORK AND COMPONENTS TO OPERATE WITH ANOTHER MEDIA FRAMEWORK

(75) Inventors: Jin Bangfei, Shanghai (CN); Chin-Yee Lin, Los Gatos, CA (US)

(73) Assignee: VisualOn, Inc., Santa Clara, CA (US)

( * ) Notice: Subject to any disclaimer, the term of this patent is extended or adjusted under 35 U.S.C. 154(b) by 368 days.

(21) Appl. No.: 12/961,428

(22) Filed: Dec. 6, 2010

(65) Prior Publication Data

US 2012/0139923 A1    Jun. 7, 2012

(51) Int. Cl.
G06F 9/44    (2006.01)
G06F 9/45    (2006.01)

(52) U.S. Cl.
USPC .............................. 717/138; 717/120; 717/136

(58) Field of Classification Search
None
See application file for complete search history.

(56) References Cited

U.S. PATENT DOCUMENTS

| | | | |
|---|---|---|---|
| 5,678,047 A * | 10/1997 | Golshani et al. | 717/138 |
| 6,708,329 B1 * | 3/2004 | Whitehill et al. | 717/136 |
| 7,080,159 B2 * | 7/2006 | Chu et al. | 717/136 |
| 7,124,413 B1 * | 10/2006 | Klemm et al. | 717/101 |
| 7,316,009 B2 * | 1/2008 | Peck | 717/138 |
| 7,685,577 B2 * | 3/2010 | Pace et al. | 717/136 |
| 7,802,238 B2 * | 9/2010 | Clinton | 717/136 |
| 7,870,490 B2 * | 1/2011 | Coles et al. | 717/120 |
| 7,900,140 B2 * | 3/2011 | Mohammed et al. | 715/249 |
| 8,286,147 B2 * | 10/2012 | Alpern et al. | 717/138 |
| 8,490,080 B2 * | 7/2013 | Janzen | 717/138 |
| 2002/0133810 A1 * | 9/2002 | Giles et al. | 717/138 |
| 2003/0121024 A1 * | 6/2003 | Hill et al. | 717/120 |
| 2004/0153561 A1 * | 8/2004 | Dalal et al. | 709/231 |
| 2007/0192818 A1 | 8/2007 | Bourges-Sevenier et al. | |
| 2008/0120592 A1 | 5/2008 | Tanguay et al. | |
| 2008/0134012 A1 * | 6/2008 | Kokes et al. | 715/201 |
| 2008/0168100 A1 | 7/2008 | Dunbar et al. | |
| 2008/0306986 A1 * | 12/2008 | Doyle, Sr. | 717/136 |
| 2009/0013310 A1 * | 1/2009 | Arner et al. | 717/120 |
| 2009/0164655 A1 * | 6/2009 | Pettersson et al. | 709/231 |
| 2009/0323800 A1 | 12/2009 | Hsiao | |
| 2012/0192208 A1 * | 7/2012 | Pascual-Borrego | 719/320 |

OTHER PUBLICATIONS

Khronos Group, OpenMAX: Streaming Media Portability, [Online] Jul. 2006, ACM Siggraph 2006 Courses, [Retrieved from the Internet] <http://dl.acm.org/ft_gateway.cfm?id=1185751 &ftid=395210&dwn=1&CFID=289929444 &CFTOKEN=44023060> pp. 1-24.*

Friedland, G.; Pauls, K., Towards a demand driven, autonomous processing and streaming architecture, [Online] Apr. 2005, [Retrieved from the Internet] <http://ieeexplore.ieee.org/stamp/stamp.jsp?tp=&arnumber=1409951>pp. 473-480.*

(Continued)

Primary Examiner — Thuy Dao
Assistant Examiner — Ravi K Sinha
(74) Attorney, Agent, or Firm — Van Pelt, Yi & James LLP

(57) ABSTRACT

A system comprises a media framework component graph, a first media framework, a second media framework, and a media framework translator. The media framework component graph comprises one or more components. The one or more components are coupled with the first media framework. The first media framework is designed to run the media framework component graph. The media framework translator enables the first media framework and the media framework component graph to both function as a component for the second media framework.

13 Claims, 9 Drawing Sheets

(56) References Cited

OTHER PUBLICATIONS

Robert Scott Mitchell, Dynamic Configuration of Distributed Multimedia Components, [Online] Aug. 2000, [Retrieved from the Internet] <http://www.cl.cam.ac.uk/research/dtg/Ice-pub/public/files/Mitchel12000.pdf> 328 pages.*

Mohan et al., Adapting Multimedia Internet Content for Universal Access, [Online] Mar. 1999, [Retrieved from the Internet] <http://ieeexplore.ieee.org/stamp/stamp.jsp?tp=&arnumber=748175> pp. 11.*

Barba et al., OpenMax Hardware Native Support for Efficient Multimedia Embedded Systems, [Online] Aug. 2010 Consumer Electronics, IEEE Transactions on, vol. 56, No. 3, [Retrieved from the Internet] <http://ieeexplore.ieee.org/stamp/stamp.jsp?tp=&arnumber=5606318> pp. 1722-1729.*

Krasic, "A Framework for Quality-Adaptive Media Streaming: Encode Once Stream Anywhere", Feb. 2004. [online] [Retrieved on Mar. 9, 2009], Retrieved from the Internet: <http://web.cecs.pdx.edu/~walpole/theses/krasic_phd.pdf> entire document.

* cited by examiner

WRAPPER FOR PORTING A MEDIA FRAMEWORK AND COMPONENTS TO OPERATE WITH ANOTHER MEDIA FRAMEWORK

BACKGROUND OF THE INVENTION

Processing and rendering media (e.g., audio or video) is a very popular application on computers, cellular phones, and embedded computing devices. Many different software applications exist to perform the media processing and rendering, some specific to one type of computing device and some which exist on multiple platforms. Underlying the software is typically a media framework application programming interface (API), which provides access to the media capabilities of the computing device. A media framework additionally has an associated set of functionality that may be used with the framework to build new media applications, referred to variously as framework components or plug-ins. These components may be authored by the framework authors and included along with the framework, or they may be authored by a third party and distributed separately. There exist several media frameworks, e.g., DirectShow, OpenMAX, GStreamer, QuickTime, Helix DNA, Xine, etc. Each framework is available for a different set of computing platforms and each has different behaviors, leading to different advantages and disadvantages for each of the media frameworks. Additionally, each media framework has a different set of components; some components are available for one media framework and not for another. There are many different reasons why one media framework might be chosen over another, including availability on a desired computing platform, cross-platform capability, availability of specific components, optimization of a particular functionality, or the developer's own particular preference. A software developer trying to move to a new media framework from one he is used to will likely have to learn new framework behaviors, as well as learn to use new framework components and to work without others, increasing development time and complexity.

BRIEF DESCRIPTION OF THE DRAWINGS

Various embodiments of the invention are disclosed in the following detailed description and the accompanying drawings.

DETAILED DESCRIPTION

Figure 1:
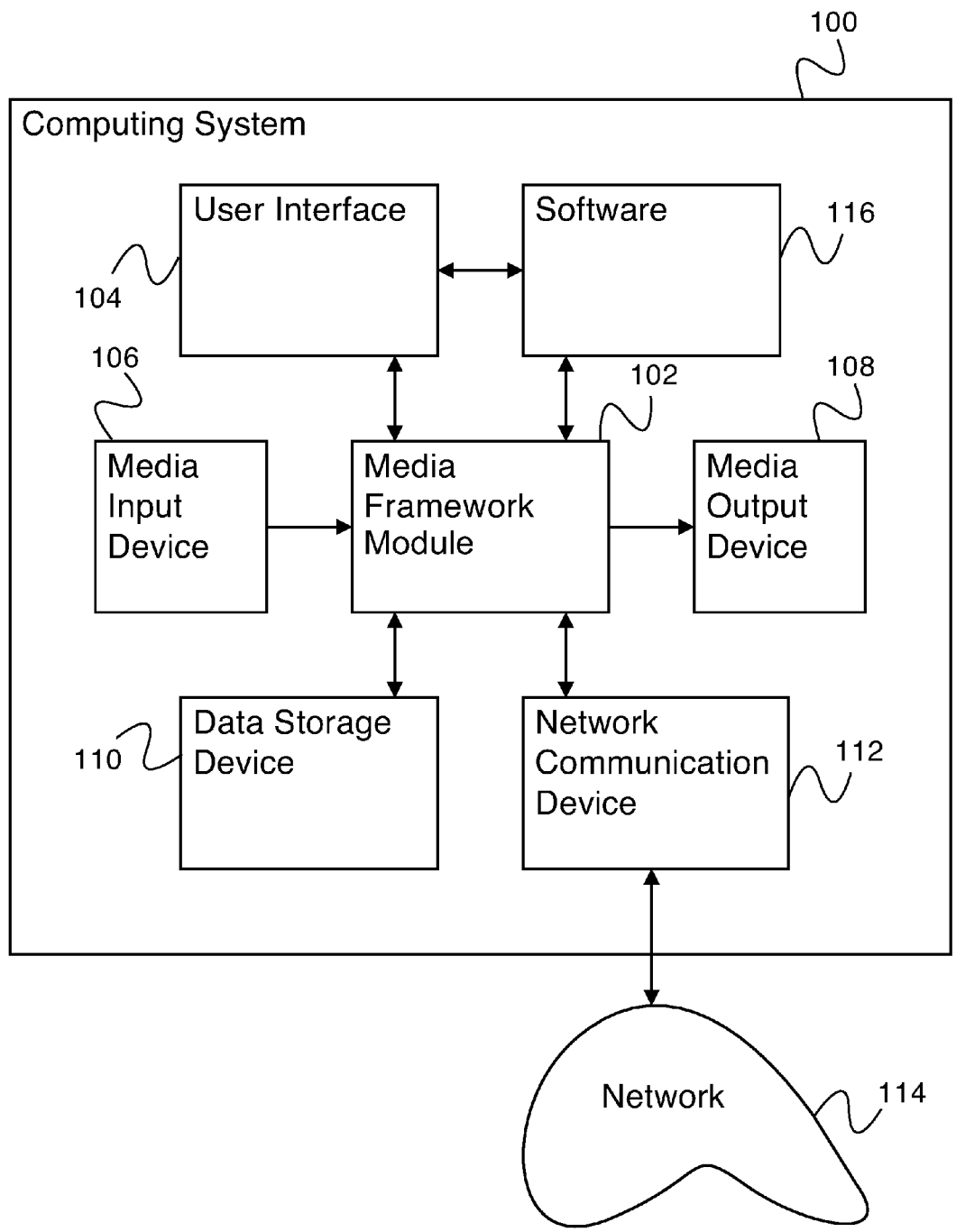
FIG. 1 is a block diagram illustrating an embodiment of a computing system with media framework module.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A wrapper for porting a media framework and components to operate with another media framework is disclosed. Translation wrapper software is used to package a multimedia software module built from a set of media framework components along with their associated media framework into a new media framework component for a different media framework. For instance, a set of components for the OpenMAX framework that form a video processing and rendering engine could be wrapped along with the OpenMax framework and any other appropriate code to create a component for the DirectShow framework with all of the functionality of the original video processing and rendering engine. In this way, a developer who is used to working with OpenMAX and with the specific set of OpenMAX components can develop for DirectShow with only minimal extra development time.

Software created by translating code will inevitably have some overhead. In this case the overhead is primarily due to the fact that there is an extra layer of communication, e.g., DirectShow communicates with OpenMAX and then OpenMAX communicates with the OpenMAX components. Performance of the translated multimedia software module will be reduced according to the activity of this communication path. A component-level translation approach, e.g., translating a set of components by repackaging each one as a component for the target framework and then building the desired multimedia software module in the target framework using the translated components, will likely create multimedia software module that suffers in this way greatly in addition to adding the tasks of porting each component to work with the target framework and in the target framework environment. For example, taking a number of OpenMAX components, translating each to work in the DirectShow environment, and making sure that each translated component is able to properly talk to the media framework DirectShow and work within the DirectShow environment. Communications between the originating media framework and the target media framework are reduced in the invention by packaging components at a functional level. A set of components that performs a desired functionality is built into a multimedia software module along with its originating framework. Communications with the multimedia software module are then limited to basic commands, such as start, stop, load file, etc. Wrapper translation code for the target framework is added to the multimedia software module, creating a new component for the target framework. Communications between the originating and target frameworks are limited to the same set of basic commands, and translation overhead is minimized as well as the translation work for each individual component.

An additional benefit to this approach over a component-level translation approach is that the developer is always working within the originating media framework, with which he is most familiar. Any idiosyncrasies of the target framework will be addressed by a well-designed wrapper. In a component-level translation approach, the developer has access to the components he is used to working with, but must use them to build a component graph within the unfamiliar target framework. Thus, not all of the benefits of improved development time will be realized.

In some embodiments, the target media framework requires at least two components to be used to create a media framework module. When necessary, the translation software includes the extra step of creating a dummy component to be used alongside the translated component in order to satisfy the media framework.

FIG. 1 is a block diagram illustrating an embodiment of a computing system with media framework module. In various embodiments, computing system 100 comprises a computer, a mobile phone or other mobile computing system, an embedded computing system, or any other appropriate computing system. In the example shown, computing system 100 comprises media framework module 102. In various embodiments, media framework module 102 comprises media framework module or translated media framework module. Media framework module 102 communicates with user interface 104, media input device 106, media output device 108, data storage device 110, network communication device 112, and software 116. User interface 104 comprises a user interface for allowing a computing system user to interact with media framework module 102 and other software 116. In some embodiments, user interface 104 comprises a device for presenting information and choices to a user (e.g., a display) and a device for receiving information from a user (e.g., a mouse, a keyboard, etc.). Media input device 106 comprises a device for receiving media input (e.g., a still camera, a video camera, a microphone) and relaying it to software on computing system 100 (e.g., media framework module 102). Media output device 108 comprises a device for projecting media output (e.g., a video display, a speaker, etc.) received from software on computing system 100 (e.g., media framework module 102). Data storage device 110 comprises a device for storing data (e.g., media data, media metadata, system information data, user data, network data, or any other appropriate data) and receiving data from and delivering data to software on computing system 100 (e.g., media framework module 102). Network communication device 112 comprises a device for communicating data (e.g., media data, media metadata, system information data, user data, network data, or any other appropriate data) with a network (e.g., network 114) and receiving data from and delivering data to software on computing system 100 (e.g., media framework module 102). In various embodiments, network 114 comprises a local area network, a wide area network, a wired network, a wireless network, the Internet, a fiber network, a storage area network, a cellular network, or any other appropriate network enabling communication. Software 116 comprises other software present on computing system 100. In various embodiments, software 116 comprises system software, media software, data processing software, user interface software, or any other appropriate software on computing system 100.

In some embodiments, computing system 100 comprises a smart phone that includes a media framework coupled to one or more components, where the media framework coupled to the one or more components is capable of loading a data file—for example, a video or audio file—and processing the data file to present the data file to a user. In various embodiments, the data file is presented to the user as a video stream displayed using a color or black and white display or an audio stream output using a speaker or headphones or broadcast to a wireless connected audio output device (e.g., a Bluetooth connected head set). In some embodiments, processing the data file includes decompressing or decrypting the data file—for example, processing the data file compatible with a format such as MPEG-1/MPEG-2/MPEG-4/H.264 (e.g. a format specified by the Moving Picture Experts Group), MP3 (e.g., MPEG-1 audio layer 3), AAC (Advanced Audio Coding), Windows Media Audio, Windows Media Video, MIDI (e.g., Musical Instrument Digital Interface), media containers such as AVI (e.g., audio video interleaved container format), ASF (e.g., advanced systems format for streaming, an audio/video container), WAV (e.g., waveform audio file format), or MOV (e.g., a quick time multimedia format). In various embodiments, data storage device 110 comprises a solid state memory (e.g., a random access memory), a magnetic memory, an optical memory, or any other appropriate data storage device.

Figure 2:
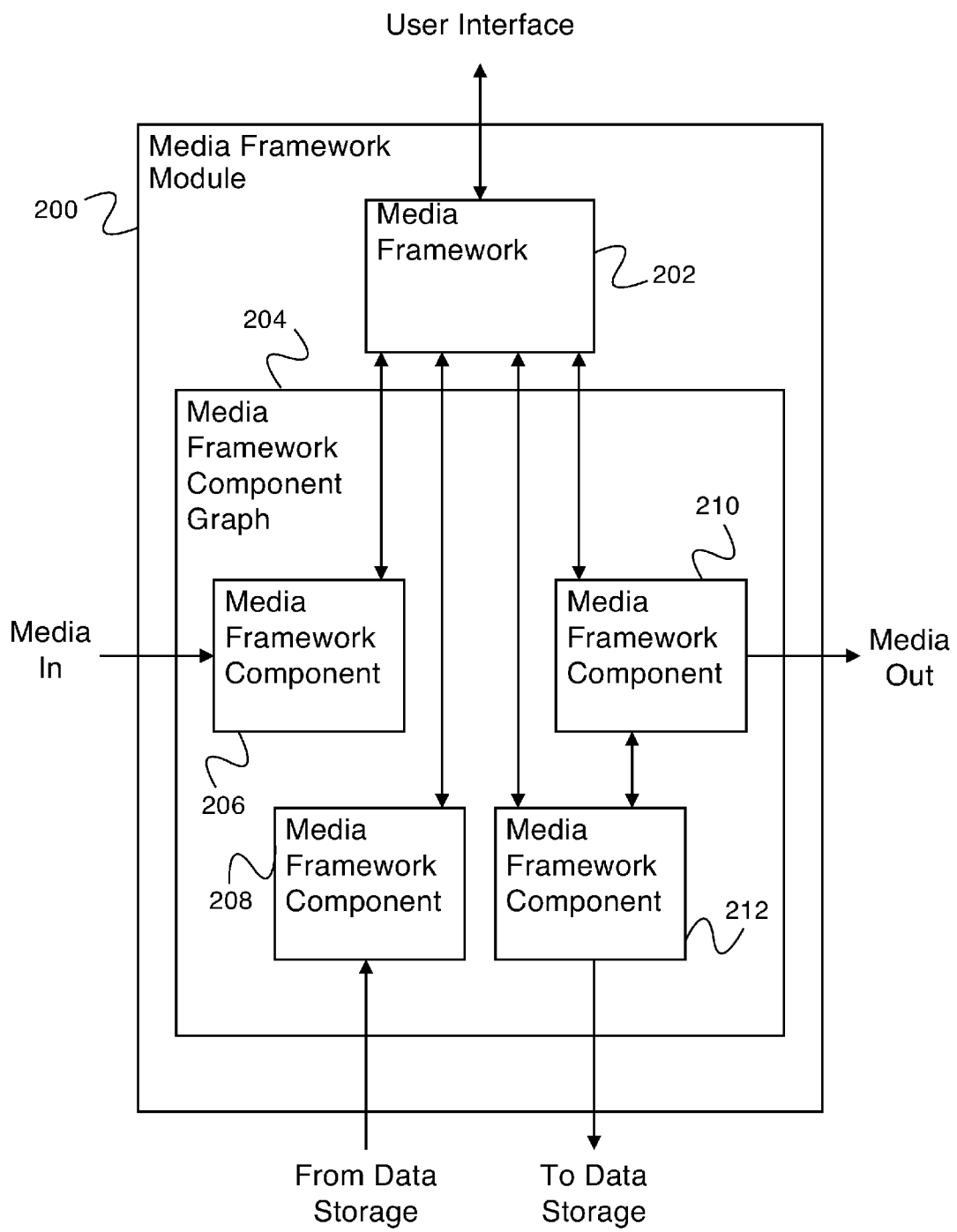
FIG. 2 is a block diagram illustrating an embodiment of media framework module.

FIG. 2 is a block diagram illustrating an embodiment of media framework module. In some embodiments, media framework module 200 comprises media framework module 102 of FIG. 1. In the example shown, media framework module 200 comprises media framework 202 and media framework component graph 204, and is running on a computing system (e.g., computing system 100 of FIG. 1). In various embodiments, media framework 202 comprises DirectShow, OpenMAX, GStreamer, QuickTime, Helix DNA, Xine or any other media framework. Media framework 202 communicates with a user interface external to media framework module 200 to receive commands from a media framework module user, and media framework 202 also communicates with media framework components forming media framework component graph 204. Media framework component graph 204 comprises media framework component 206, media framework component 208, media framework component 210, and media framework component 212. In various embodiments, media framework component graph 204 comprises 1, 2, 5, 10, 22, 84, or any other appropriate number of media framework components. Some media frameworks place one or more restrictions on the number of media framework components comprising media framework component graph 204, e.g., DirectShow requires two or more media framework components be present in media framework component graph 204.

The media framework components forming media framework component graph 204 communicate with each other, with media framework 202, and with externally available computing resources as appropriate. For example, media framework component 206 does not communicate directly with another media framework component but communicates with media framework 202. If media framework component 206 needs to communicate with media framework component 208, for instance, communications are routed through media framework 202. On the other hand, media framework component 210 and media framework 212 have a direct connection established, and are able to communicate directly with one another. Media framework component 206 receives information from a streaming media (e.g., audio, video, a composite audio/video signal, or any other appropriate media type) source (e.g., media input device 106 of FIG. 1) and processes the streaming media source or sends it to another media framework component. Media framework component 208 receives data (e.g., media data, media metadata, or any other appropriate kind of data) from a data storage (e.g., data storage device 110 of FIG. 1) external to media framework module 200 and processes the data or sends it to another media framework component. Media framework component 210 delivers information to a media output (e.g., a coupled media output device 108 of FIG. 1). In various embodiments, information delivered by media framework component 210 to a media output device is derived from media received by media framework component 206, from data received from media framework component 208, or by any other appropriate means. Media framework component 212 delivers information to a data storage (e.g., data storage device 110 of FIG. 1) external to media framework module 200. In various embodiments, information delivered by media framework component 212 to the data storage device is derived from media received by media framework component 206, from data received from media framework component 208, or by any other appropriate means. In some embodiments, a media framework component communicates only with media framework 202 and does not communicate with any other media framework component or with any external media or storage device. In some embodiments, a media framework component communicates only with the media framework and with other media framework components and do not communicate with any external media or storage devices. In some embodiments, a media framework component communicates with a network (e.g., network 114 of FIG. 1). In some embodiments, a media framework component communicates with other software running on a computing system (e.g., software 116 of FIG. 1).

Figure 3:
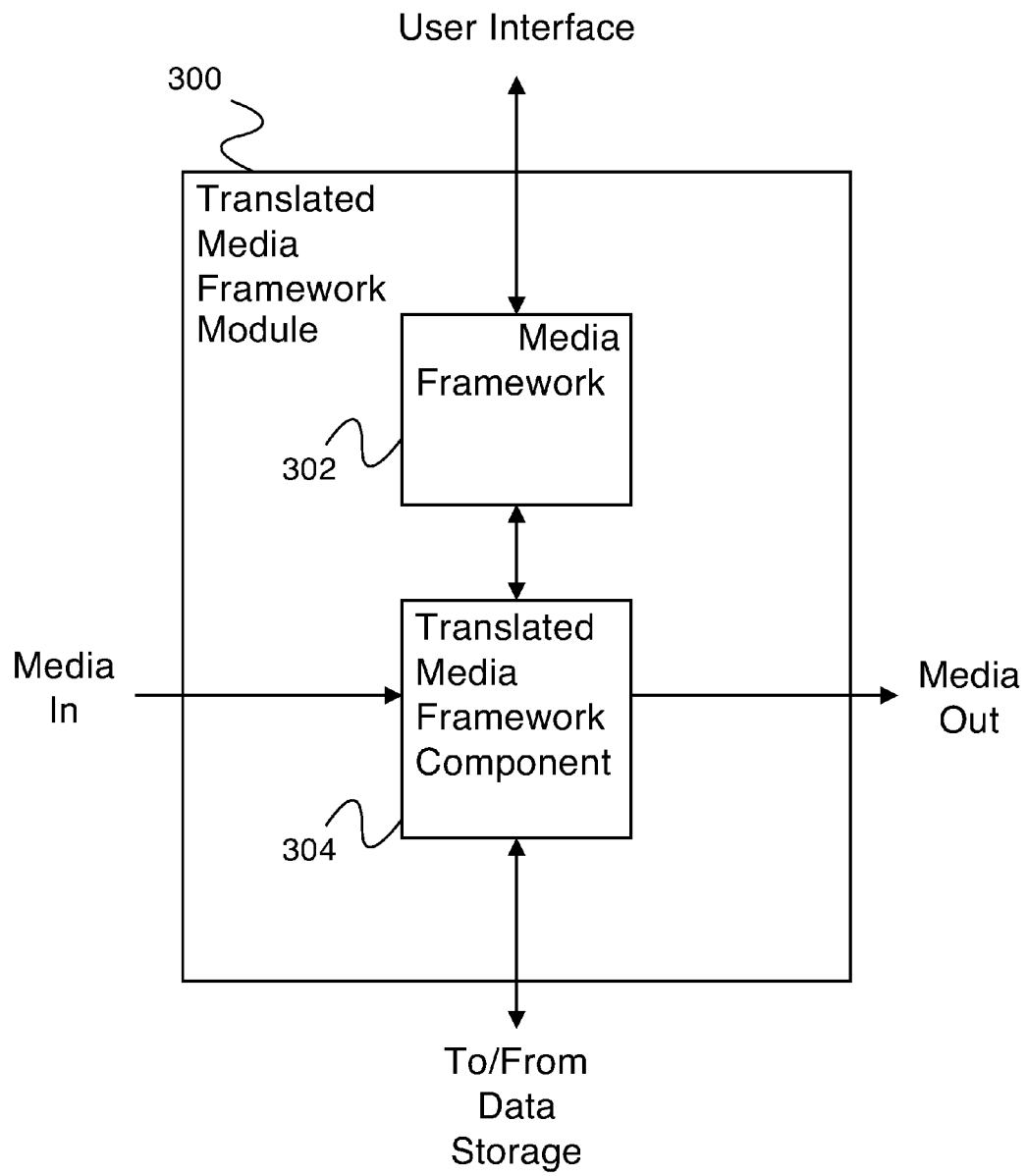
FIG. 3 is a block diagram illustrating an embodiment of translated media framework module.

FIG. 3 is a block diagram illustrating an embodiment of translated media framework module. In some embodiments, translated media framework module 300 comprises media framework module 102 of FIG. 1. In the example shown, translated media framework module 300 comprises media framework 302 and translated media framework component 304, and is running on a computing system (e.g., computing system 100 of FIG. 1). In various embodiments, media framework 302 comprises DirectShow, OpenMAX, GStreamer, QuickTime, Helix DNA, Xine or any other established media framework. Media framework 302 communicates with a user interface external to translated media framework module 300 to receive commands from a media framework module user, and media framework 302 also communicates with translated media framework component 304. Translated media framework component 304 takes the place of a media framework component graph (e.g., a media framework component graph such as media framework component graph 204 of FIG. 2). Some media frameworks place one or more restrictions on the number of media framework components comprising the media framework component graph, e.g., DirectShow requires two or more media framework components be present in the media framework component graph. In the event that translated media framework component 304 does not satisfy a restriction placed by media framework 302, an action is taken to satisfy the restriction without affecting the behavior of translated media framework component 304. In some embodiments, translated media framework module 300 additionally comprises a dummy media framework component in order to satisfy a restriction placed by the media framework. Translated media framework component 304 receives information from a streaming media (e.g., audio, video, a composite audio/video signal, or any other appropriate media type) source (e.g., media input device 106 of FIG. 1) and delivers media to a media output device (e.g., media output device 108 of FIG. 1). Translated media framework component 304 additionally sends and receives data (e.g., media data, media metadata, or any other appropriate kind of data) to and from a data storage (e.g., data storage device 110 of FIG. 1) external to media framework module 200. In some embodiments, translated media framework component 304 communicates with a network (e.g., network 114 of FIG. 1). In some embodiments, translated media framework component 304 communicates with other software running on the computing system (e.g., software 116 of FIG. 1).

Figure 4A:
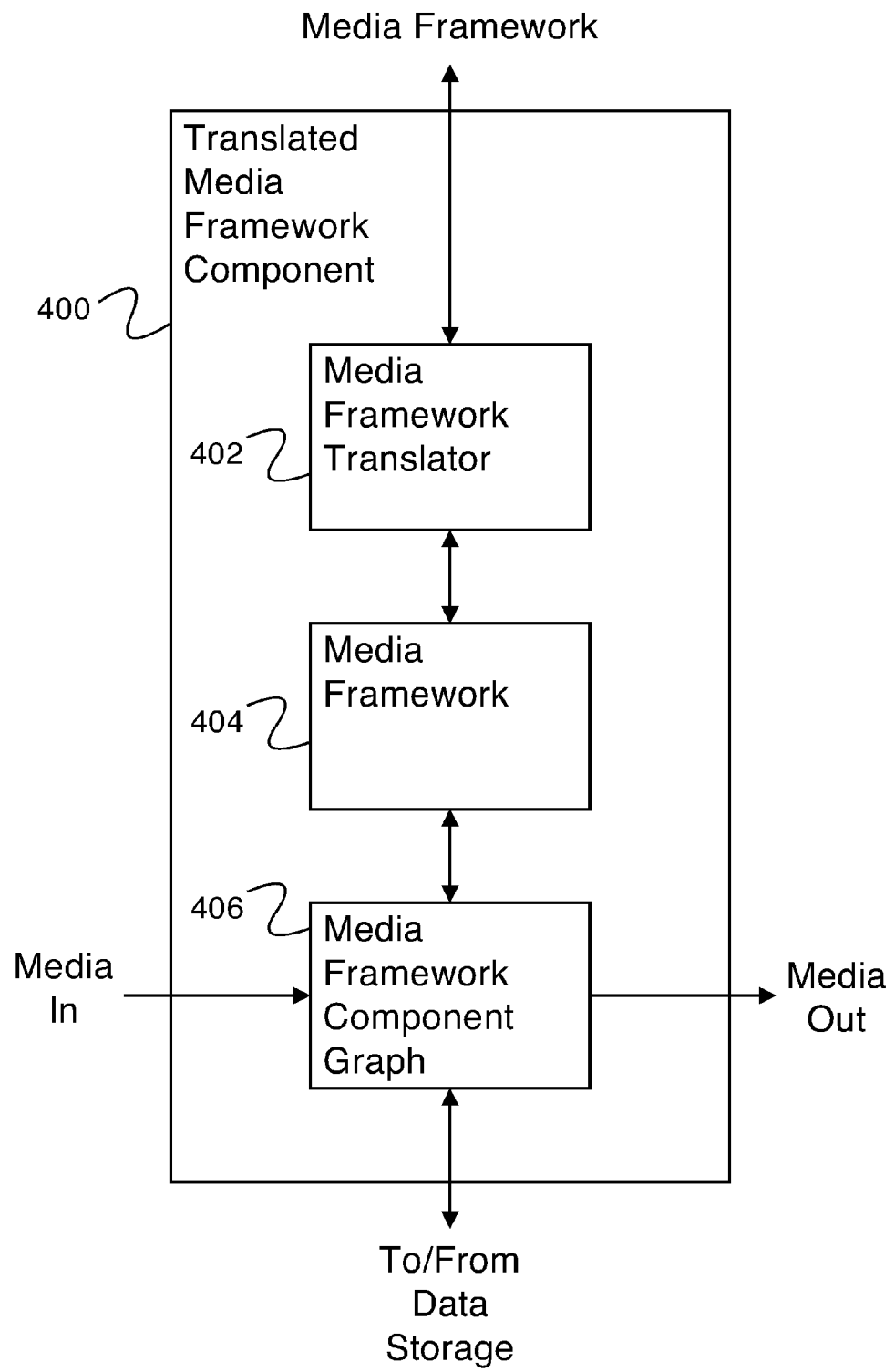
FIG. 4A is a block diagram illustrating an embodiment of a translated media framework component.

FIG. 4A is a block diagram illustrating an embodiment of a translated media framework component. In some embodiments, translated media framework component 400 comprises translated media framework component 304 of FIG. 3. In the example shown, translated media framework component 400 comprises media framework translator 402, media framework 404, and media framework component graph 406. Media framework component graph 406 comprises a media framework component graph (e.g., media framework component graph 204 of FIG. 2), and media framework 404 comprises a media framework (e.g., media framework 202 of FIG. 2). In some embodiments, media framework component graph 406 and media framework 404 can be combined to form media framework module (e.g., media framework module 200 of FIG. 2). Media framework component graph 406 receives information from a streaming media (e.g., audio, video, a composite audio/video signal, or any other appropriate media type) source (e.g., media input device 106 of FIG. 1) and delivers media to a media output device (e.g., media output device 108 of FIG. 1). In some embodiments, streaming media information received by translated media framework component 400 is received and processed by media framework translator 402 and sent to media framework component graph 406. In some embodiments, streaming media information delivered by media framework component graph 406 is received and processed by media framework translator 402. In various embodiments, processing streaming media information comprises changing a format, changing header information, processing streaming media information with a function call, or any other appropriate streaming media processing. Translated media framework component 406 additionally sends and receives data (e.g., media data, media metadata, or any other appropriate kind of data) to and from data storage (e.g., data storage device 110 of FIG. 1) external to media framework module 200. In some embodiments, translated media framework component 406 communicates with a network (e.g., network 114 of FIG. 1). In some embodiments, translated media framework component 406 communicates with other software running on a computing system (e.g., software 116 of FIG. 1).

Media framework 404 communicates with media framework translator 402. Media framework translator 402 comprises a software interface for media framework 404 for controlling and interpreting communications from media framework. Communications received by media framework translator 402 from media framework 404 are translated and communicated to an external media framework (e.g., media framework 302 of FIG. 3). Media framework 404 and the external media framework comprise different media frameworks (e.g., media framework 404 comprises OpenMax and the external media framework comprises DirectShow). Media framework translator 402 comprises a software interface designed for the specific combination of media frameworks used for media framework 404 and the external media framework (e.g., media framework translator 402 comprises a first piece of code if media framework 404 comprises OpenMax and the external media framework comprises DirectShow, and media framework translator 402 comprises a second piece of code if media framework 404 comprises OpenMax and the external media framework comprises GStreamer). Media framework translator 402 is designed to communicate with the external media framework in such a way that translated media framework component 400 appears to the external media framework like a media framework component (e.g., a media framework component such as media framework component 206 of FIG. 2). In some embodiments, the functionality of the media framework component created by translated media framework component 400 comprises the functionality of the media framework module that could be created by the combination of media framework component 404 and media framework component graph 406. In some embodiments, media framework translator 402 comprises both a media framework translator and a component wrapper. A component wrapper comprises a wrapper for allowing a media framework and a media framework component graph to run in an environment other than that which it was designed for. In various embodiments, a component wrapper provides environment variables, software libraries, operating system virtualization, or any other appropriate software for allowing a media framework and a media framework component graph to run in an environment other than that which it was designed for. In some embodiments, media framework 404 can run natively in the environment of the external media framework and does not require a component wrapper.

In a typical media framework module (e.g., media framework module 200 of FIG. 2) formed by the combination of a media framework and a media framework component graph, communications by the media framework out of the media framework module are relatively limited. In some embodiments, communications by the media framework out of the media framework module are limited to user interface communications. High bandwidth communications (e.g., streaming media communications, data storage communications, other data communications) are made directly with one or more of the media framework components forming the media framework component graph and do not pass through the media framework. In a translated media framework module (e.g., translated media framework module 300 of FIG. 3) formed from translated media framework component 400, high bandwidth communications are made directly to media framework component graph 406 and do not pass through either media framework 404 or the external media framework. Since media framework 404 and the external media framework are not involved with high bandwidth communications in the translated media framework module (and therefore, neither is media framework translator 402), the extra software and complexity of translation as compared with a typical media framework module do not affect the rate of the high bandwidth communication, and therefore add little additional overhead to the module functionality.

Figure 4B:
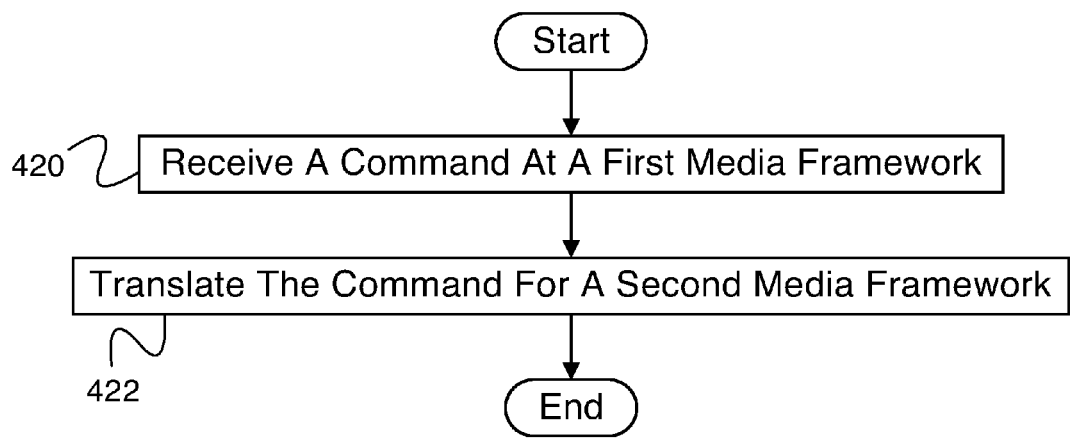
FIG. 4B is a flow diagram illustrating an embodiment of a process for translating a command.

FIG. 4B is a flow diagram illustrating an embodiment of a process for translating a command. In the example shown, in 420 a command is received at a first media framework. In various embodiments, the command comprises one or more of the following a start command, a stop command, a pause command, a get current media position command, a set current media position command, a get duration command, an end of stream notification command, or any other appropriate command. In some embodiments, the command comprises a reduced command set to a media framework—for example, only a start command, a stop command, and a pause command. In 422, the command is translated for a second media framework. In some embodiments, translating the command comprises interpreting a command for a component of the first media framework and issuing the same command for the second media framework. For example, a DirectShow to OpenMax translator receives a DirectShow component stop command and sends in response an OpenMax media framework stop command. In some embodiments, the command set includes commands associated with values, e.g., get current media position. In some embodiments, when the command set includes a command associated with a value, translating the command additionally comprises formatting the associated value—for example, a first media framework may have a time format that is a value in minutes but a second media framework may have a time format in hours, minutes, and seconds and the translator appropriately converts between the two time formats.

Figure 4C:
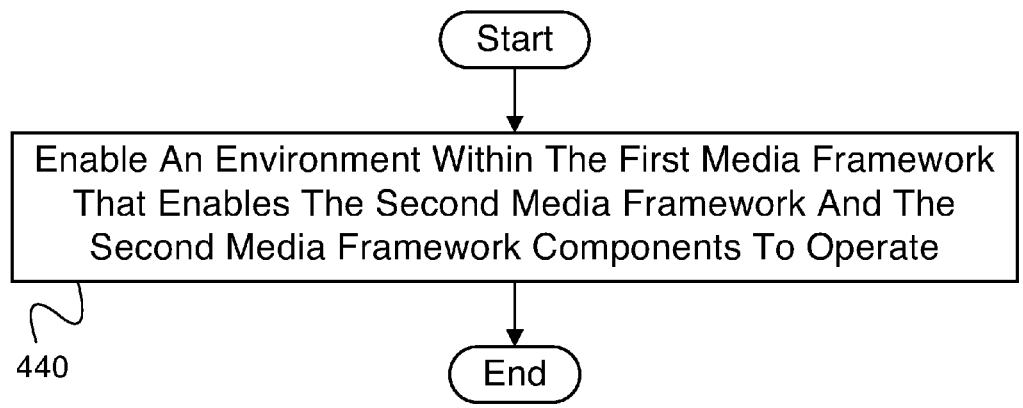
FIG. 4C is a flow diagram illustrating an embodiment of a process for supporting a second media framework in a first media framework environment.

FIG. 4C is a flow diagram illustrating an embodiment of a process for supporting a second media framework in a first media framework environment. In the example shown, in 440 enable an environment within the first media framework that enables the second media framework and the second media framework components to operate. For example, a shell is created to run a second media framework environment/operating system in order to translate a command/operating instruction from a second media framework and/or one or more second media framework components coupled with the second media framework to a command/operating instruction that is able to execute in the operating environment of the first media framework. In some embodiments, the shell comprises a virtual environment for the second media framework inside the second media framework. In some embodiments, a shell is not used and the second media framework and the second media framework component(s) (e.g., a component graph) are compiled or converted to operate directly in the environment of the first media component. For example, the second media framework and/or second media framework components are enabled to operate on a given processor, in a given operating system, etc. of the first media framework.

Figure 5A:
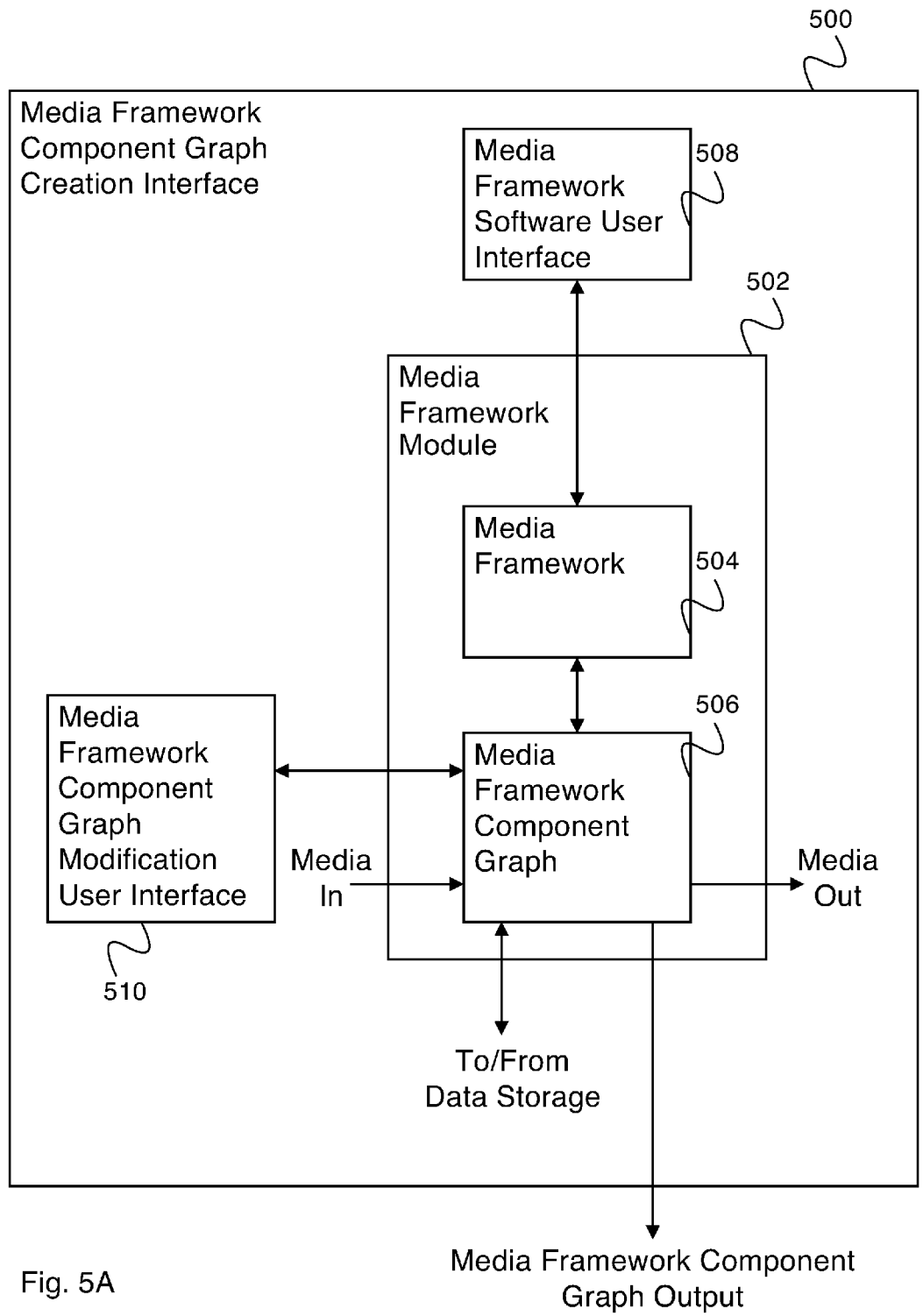
FIG. 5A is a block diagram illustrating an embodiment of a media framework component graph creation interface.
Figure 5B:
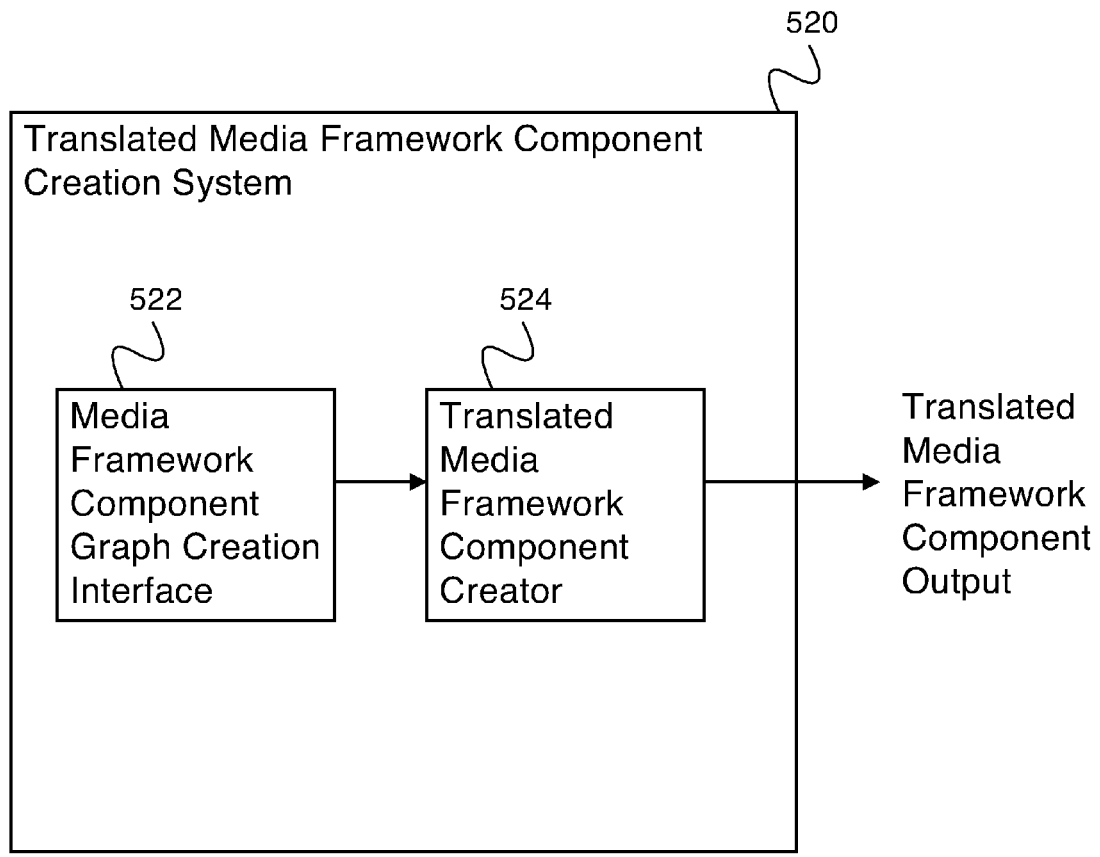
FIG. 5B is a block diagram illustrating an embodiment of a translated media framework component creation system.

FIG. 5A is a block diagram illustrating an embodiment of a media framework component graph creation interface. In some embodiments, media framework component graph creation interface 500 of FIG. 5A comprises an interface for creating a media framework component graph (e.g., translated media framework component 204 of FIG. 2). In the example shown, media framework component graph creation interface 500 comprises media framework module 502, media framework software user interface 508, and media framework component graph modification user interface 510. Media framework module 502 comprises media framework 504 and media framework component graph 506. Media framework 504 comprises a media framework (e.g., media framework 202 of FIG. 2) for running media framework component graph 506. Media framework component graph 506 comprises a media framework component graph (e.g., media framework component graph 204 of FIG. 2). In some embodiments, a developer uses media framework component graph creation interface 500 to develop a media framework component graph (e.g., media framework component graph 506). In some embodiments, a developer uses media framework component graph creation interface 500 to develop a media framework component graph that will be part of a translated media framework component (e.g., translated media framework component 400 of FIG. 4). The developer uses media framework software user interface 508 to interact with the software in development, and media framework component graph modification user interface 510 to modify media framework component graph 506 in the process of developing the software. When the developer is satisfied with media framework component graph 506, he indicates to media framework component graph modification user interface 510 that media framework component graph 506 is complete, and media framework component graph creation user interface 500 outputs the media framework component graph FIG. 5B is a block diagram illustrating an embodiment of a translated media framework component creation system. In some embodiments, translated media framework component creation system 520 is used to create a translated media framework component (e.g., translated media framework component 400 of FIG. 4A). In the example shown, translated media framework component creation system 520 comprises media framework component graph creation interface 522 and translated media framework component creator 524. In some embodiments, media framework component graph creation interface 522 comprises media framework component graph creation interface 500 of FIG. 5. In the example shown, translated media framework component creator 524 receives a media framework component graph (e.g., media framework component graph 406 of FIG. 4A) from media framework component graph creation user interface 522. Translated media framework component creator 524 appends a media framework (e.g., media framework 404 of FIG. 4A) and a media framework translator (e.g., media framework translator 402 of FIG. 4A) to the media framework component graph to create a translated media framework component and outputs the translated media framework component.

Figure 6:
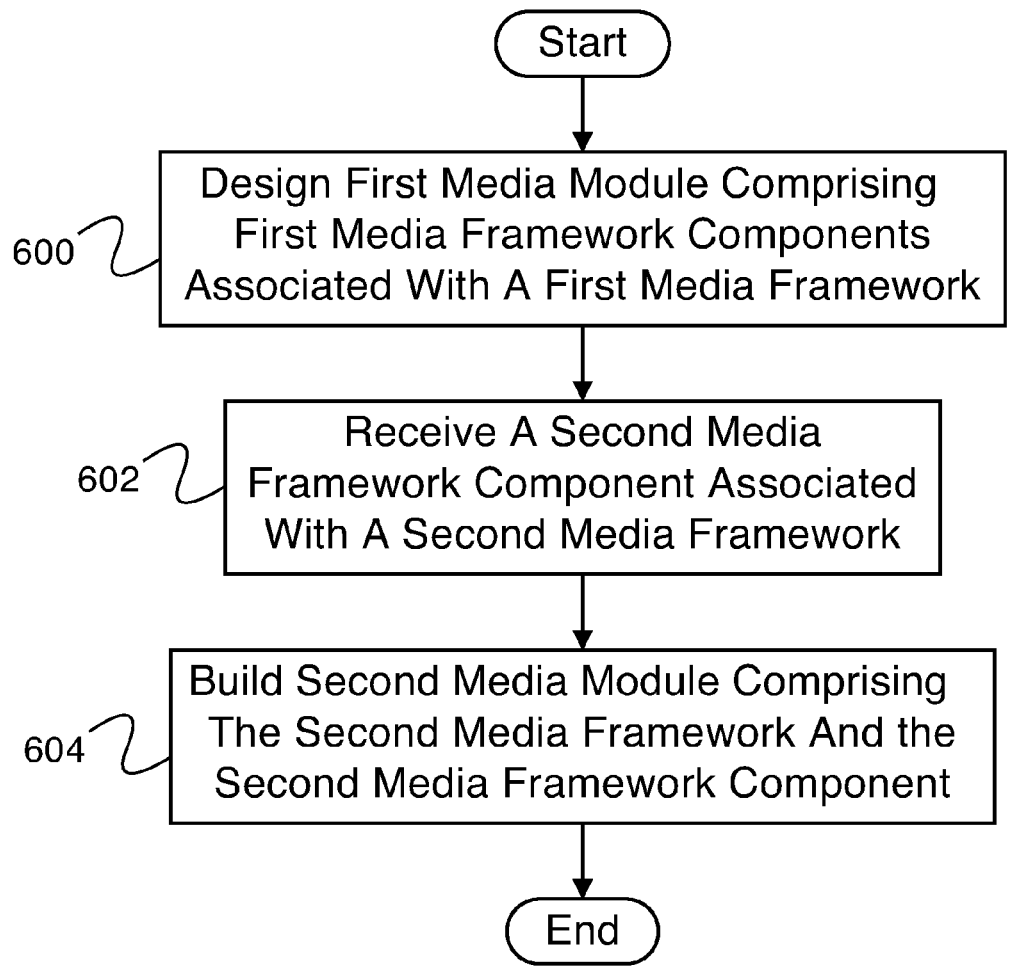
FIG. 6 is a flow diagram illustrating an embodiment of a process for creating translated media framework software.

FIG. 6 is a flow diagram illustrating an embodiment of a process for creating translated media framework module. In some embodiments, the process of FIG. 6 is carried out by a media framework module developer. In the example shown, in 600, first media module comprising first media framework components associated with a first media framework is designed. In some embodiments, the first media module comprises media framework module (e.g., media framework module 200 of FIG. 2). In some embodiments, the first media framework comprises a media framework (e.g., media framework 202 of FIG. 2). In various embodiments, the first media framework comprises DirectShow, OpenMAX, GStreamer, QuickTime, Helix DNA, Xine, or any other appropriate media framework. In some embodiments, the first media framework components comprise a media framework component graph (e.g., media framework component graph 204 of FIG. 2). In some embodiments, the first media module is designed using a media framework component graph creation interface (e.g., media framework component graph creation interface 500 of FIG. 5A).

In 602, a second media framework component associated with a second media framework is received. In some embodiments, the second media framework component is received by the media framework module developer from a translated media framework component creation system (e.g., translated media framework component creation system 520 of FIG. 5B). In some embodiments, the second media framework component comprises the first media module, e.g., the second media framework component comprises the first media framework and associated first media framework components. In various embodiments, the second media framework comprises DirectShow, OpenMAX, GStreamer, QuickTime, Helix DNA, Xine, or any other appropriate media framework. In some embodiments, the second media framework component additionally comprises a media framework translator. In some embodiments, the media framework translator is specific to the first media framework and the second media framework. In some embodiments, the second media framework component is a translated media framework component (e.g., translated media framework component 400 of FIG. 4A).

In 604, second media module comprising the second media framework and the second media framework component is built. In some embodiments, the second media module comprises translated media framework module (e.g., translated media framework module 300 of FIG. 3). In some embodiments, the functionality of the second media module is the same as the functionality of the first media module. In some embodiments, the second media module additionally comprises a dummy media framework component. In various embodiments, the second media software comprises a media application, a media plug-in, a media add-on, a media feature, or any other appropriate media software.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer implemented method comprising:
providing, using one or more processors, a translated media framework component, comprising:
 a media framework component graph, wherein the media framework component graph comprises one or more components;
 a first media framework, wherein the one or more components in the media framework component graph are coupled with the first media framework, and wherein the first media framework is designed to run the media framework component graph;
 a media framework translator that translates communications from the first media framework and transmits the translated communications to an external media framework; and
providing a shell that enables the first media framework and the media framework component graph to operate within an environment associated with a different media framework, wherein the shell enables the first media framework and the media framework component graph to operate within an environment associated with a second media framework, and wherein the shell is created to run a virtual environment or an operating system associated with the first media framework; and
providing the second media framework, wherein the second media framework receives communications from the first media framework via the media framework translator, and wherein the media framework translator enables the translated media framework component to function as a component for the second media framework.

2. A system comprising:
one or more processors configured to provide:
 a translated media framework component, comprising:
  a media framework component graph, wherein the media framework component graph comprises one or more components;
  a first media framework, wherein the one or more components in the media framework component graph are coupled with the first media framework, and wherein the first media framework is designed to run the media framework component graph; and a media framework translator that translates communications from the first media framework and transmits the translated communications to an external media framework; and a shell that enables the first media framework and the media framework component graph to operate within an environment associated with a different media framework, wherein the shell enables the first media framework and the media framework component graph to operate within an environment associated with a second media framework, and wherein the shell is created to run a virtual environment or an operating system associated with the first media framework;

the second media framework, wherein the second media framework receives communications from the first media framework via the media framework translator, and wherein the media framework translator enables the translated media framework component to function as a component for the second media framework; and a memory coupled to the processor and configured to provide the processor with instructions.

3. A system as in claim 2, wherein the second media framework running coupled to the media framework translator which in turn is coupled with the first media framework and the media framework component graph is substantially the same as the first media framework running coupled to the media framework component graph.

4. A system as in claim 2, wherein the first media framework comprises one of the following: DirectShow, OpenMAX, GStreamer, QuickTime, Helix DNA, or Xine.

5. A system as in claim 2, wherein the second media framework comprises one of the following: DirectShow, OpenMAX, GStreamer, QuickTime, Helix DNA, or Xine.

6. A system as in claim 2, wherein the media framework translator translates a reduced command set.

7. A system as in claim 6, wherein the reduced command set comprises a start command, a stop command, and a pause command.

8. A system as in claim 2, wherein the media framework translator translates a start command.

9. A system as in claim 2, wherein the media framework translator translates a stop command.

10. A system as in claim 2, wherein the media framework translator translates a pause command.

11. A system as in claim 2, wherein the first media framework and the media framework component graph are converted to operate directly in an environment of the second media framework.

12. A system as in claim 2, wherein the first media framework and the media framework component graph are compiled to operate directly in an environment of the second media framework.

13. A computer program product, the computer program product being embodied in a non-transitory computer readable storage medium and comprising computer instructions for:

providing a translated media framework component, comprising:
a media framework component graph, wherein the media framework component graph comprises one or more components;
a first media framework, wherein the one or more components in the media framework component graph are coupled with the first media framework, and wherein the first media framework is designed to run the media framework component graph;
a media framework translator that translates communications from the first media framework and transmits the translated communications to an external media framework; and providing a shell that enables the first media framework and the media framework component graph to operate within an environment associated with a different media framework, wherein the shell enables the first media framework and the media framework component graph to operate within an environment associated with a second media framework, and wherein the shell is created to run a virtual environment or an operating system associated with the first media framework; and providing the second media framework, wherein the second media framework receives communications from the first media framework via the media framework translator, and wherein the media framework translator enables the translated media framework component to function as a component for the second media framework.

* * * * *